United States Patent [19]

Stella et al.

[11] 3,955,859
[45] May 11, 1976

[54] BEARING WITH MULTIPLE LIP SEAL

[75] Inventors: Leo Stella, Bristol; Cameron Gualco Gardella, Woodbury, both of Conn.

[73] Assignee: The Torrington Company, Torrington, Conn.

[22] Filed: Mar. 25, 1975

[21] Appl. No.: 561,859

[52] U.S. Cl. .............................. 308/36.1; 277/70; 277/94; 308/187.1
[51] Int. Cl.² .................... F16C 33/76; F16C 33/80
[58] Field of Search ............ 308/187.1, 36.1, 187.2, 308/187, 187.21; 277/90, 94, 78, 95, 136–138, 168, 189, 79, 235, 53, 70, 74, 75, 58, 70

[56] References Cited
UNITED STATES PATENTS

| 3,612,547 | 10/1971 | Kan | 277/58 |
|---|---|---|---|
| 3,642,335 | 2/1972 | Takahashi et al. | 277/94 |
| 3,768,880 | 10/1973 | Howe | 308/187.2 |
| 3,854,734 | 12/1974 | West | 308/187.2 |
| 3,858,950 | 1/1975 | Otto | 308/187.1 |

Primary Examiner—M. H. Wood, Jr.
Assistant Examiner—Richard A. Bertsch
Attorney, Agent, or Firm—Frank S. Troidl

[57] ABSTRACT

An annular seal is located in the annular space between a housing and a relatively rotatable shaft mounted in the housing. The annular seal includes a plurality of axially spaced annular lips. An opening is provided through the annular lip facing the annular bearing space which contains lubricant and preferably an opening is provided through each of the other axially spaced annular lips. Also, preferably the opening through each annular lip is circumferentially spaced approximately 180° from the opening through each adjacent lip in order to have a longer labyrinth passageway and to assure complete filling of the seal space between the sealing lips with lubricant.

20 Claims, 5 Drawing Figures

BEARING WITH MULTIPLE LIP SEAL

This invention relates to seals and sealed bearings. More particularly, this invention is a new and improved labyrinth seal and a bearing containing the seal.

Our new bearing comprises a housing or outer race with an axial bore and a rotatable shaft or inner race of less diameter than the diameter of the bore mounted in the housing. The annular bearing space thus provided between housing and shaft in part contains a lubricant.

An annular seal is located in the annular space and includes an annular main body portion, an annular axially inner lip, and at least one annular lip axially spaced from the inner lip. The main body portion may contain a stiffening insert. At least one opening is provided in the inner lip with the opening extending from the annular bearing space containing the lubricant, through the lip and into the annular seal space provided by the two axially spaced lips. In preferred two-lip seal modifications an opening is also provided in the outer annular lip. The opening in the outer annular lip is preferably circumferentially spaced approximately 180° from the opening in the inner annular lip, thus forming a labyrinth passageway through the seal. In two-lip designs in which the inner lip has two or more circumferentially spaced openings, the openings in the outer lip would preferably be circumferentially spaced midway between the openings in the inner lip. In three-lip seal modifications with one opening in each seal, the openings in the inner lip and the outer lip may be aligned, and the opening in the middle lip circumferentially spaced approximately 180° from the aligned openings, thus forming an even longer labyrinth passageway through the seals.

The openings in the annular lips may be holes through the sealing lips or may be notches through the lips adjacent the lip-contacting surface of the shaft or housing. If desired, the openings in one lip may be holes while the openings in the other lip are notches. The notches or holes relieve the pressure inside the bearing and seal when lubricant is forced inside and allow easy lubricant flow over the entire annular seal space between the sealing lips which form the labyrinth guard against intrusion of contaminates. The lubricant within the seal cooperates with the labyrinth seal to form an even better barrier to contaminates.

The invention may be further understood by the following detailed description and drawings in which.

In the various figures, like parts are referred to by like numbers.

Figure 1:
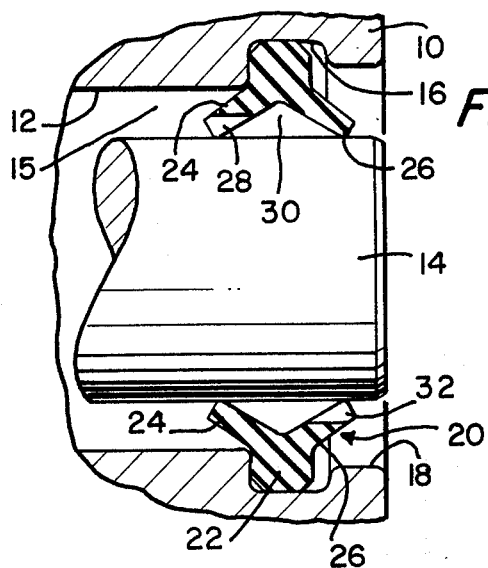
FIG. 1 is an elevational, sectional view illustrating one embodiment of our invention.

Our new bearing includes a housing or outer race or outer ring 10 with an axial bore 12 and a rotatable shaft or inner race or inner ring 14. The diameter of the rotatable shaft is less than the diameter of the bore in the housing thereby providing an annular bearing space 15 which contains lubricant. A circumferential groove 16 of greater diameter than the bore 12 may be provided in the housing. There may also be a counter-bore 18 with diameter greater than bore 12 and less than groove 16. The diameter of counter-bore 18 in housing 10 is such that the annular seal 20 may be fitted in place by pressing the annular seal 20 into the counter-bore 18 and locating the annular seal within the groove 16. It is also possible to press fit the seal, preferably including a stiffening member, in the housing bore.

The annular seal 20 includes an annular main body portion 22, an annular inner lip 24, and an annular outer lip 26. The annular lips 24 and 26 are axially spaced apart and are in wiping contact with the shaft 14.

In the embodiment shown in FIG. 1, at least one opening, such as the axially extending notch 28 adjacent shaft 14, extends through the annular lip 24 from the annular bearing space 15 to the annular seal space 30 provided by the axially spaced lips 24 and 26.

The outer annular lip 26 also contains at least one opening such as notch 32 extending axially adjacent the shaft 14. The notch 28 in the annular lip 24 and notch 32 in annular lip 26 are circumferentially spaced from one another. Preferably the circumferential spacing is approximately 180°, thus providing the longest possible labyrinth passageway past the seal to keep out foreign matter while maintaining an opening to balance the fluid pressure from one side of the seal to the other.

When lubricant is forced into the annular space 15, or when a temperature change tends to change the interior pressure or when the exterior pressure is changed as by an airplane utilizing the bearing changing altitude, and the relative pressure changes in said annular space, the notch 28 provides a purging opening to relieve the pressure differential which may otherwise act to dislodge the seal 20 from its intended position in the bearing. The notch 28 allows lubricant to enter and fill the cavity 30 between the seal lips 24 and 26. This forms a torous of lubricant which acts to further seal and to trap external contaminate which might otherwise enter past the sealing lips. This lubricant torous also provides lubrication to the outer seal lip which can otherwise wear at a rapid rate if lubrication is not provided.

The approximate 180° circumferential separation of notch 28 in annular lip 24, from notch 32 in annular lip 26 helps to completely fill the space 30 between the sealing lips. The pressurized lubricant enters the annular seal space 30 through the notch 28, then diverts circumferentially in each direction filling the space 30 and finally purging through notch 32.

Figure 2:
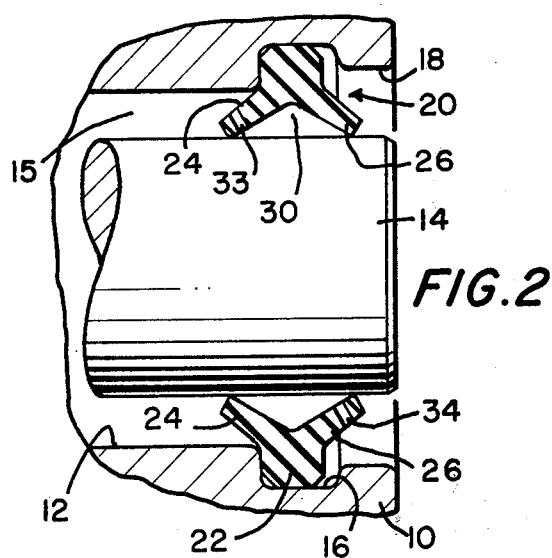
FIG. 2 is an elevational, sectional view illustrating a second embodiment of our invention.

For some operations, it may be desirable not to interrupt the sealing contact of the lips 24 and 26 against the shaft 14. In such cases, as shown in FIG. 2, a hole 33, instead of a notch, is formed through the annular lip 24 and extends from the annular bearing space 15 through lip 24 and into the annular seal space 30 formed by the lips 24 and 26. A hole 34 is also formed in annular lip 26 and extends through the annular lip 26 from the annular seal space 30 to the outside of the seal. The holes are spaced circumferentially 180° apart. Where there are two or more holes in each lip, the holes in the second lip are spaced circumferentially midway between the holes in the first lip. The holes may be of any shape or alignment, and for ease of molding may be parallel to the seal axis.

Figure 3:
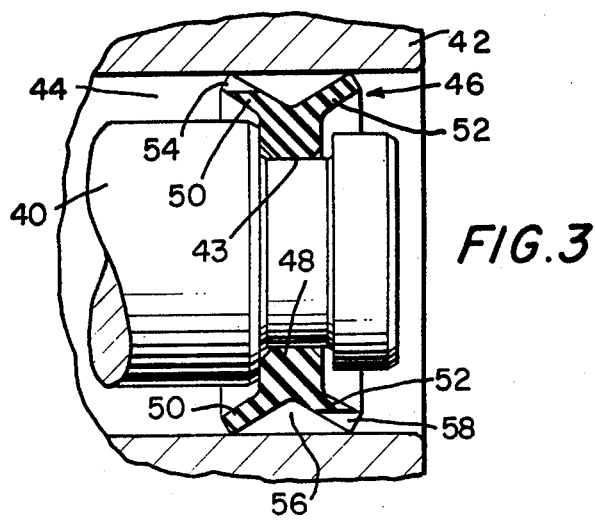
FIG. 3 is an elevational, sectional view illustrating a third embodiment of our invention.

In FIG. 3, the seal lips contact the housing rather than the shaft. As shown in FIG. 3, the shaft 40 is mounted for relative rotation within the housing 42 with the annular space 44 containing the lubricant. The annular seal 46 has its annular main body portion 48 located within an annular groove 43 formed in the shaft 40. Axially spaced apart inner lip 50 and outer lip 52 are in wiping contact with the housing 42. An axially extending notch 54 adjacent housing 42 extends from annular bearing space 44 through lip 50 and into the annular seal space 56 provided by the axially spaced apart lips 50 and 52. An axially extending notch 58 in lip 52 extends adjacent the housing from the annular space 56 through lip 52 to the outside of the seal. Sometimes, instead of having a groove, the seal will be press fit onto the shaft. A preferred structure for such a press fit would include a stiffening member with the seal.

Figure 4:
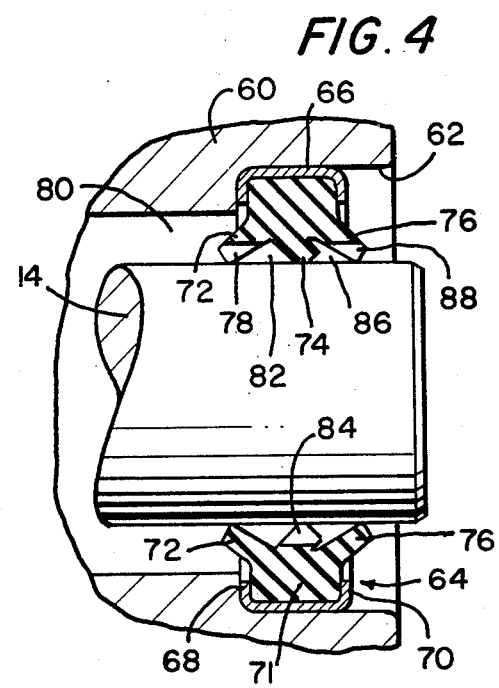
FIG. 4 is an elevational, sectional view showing a fourth embodiment of our invention.

In the embodiment shown in FIG. 4, the shaft or inner race 14 is rotatably mounted within a housing or outer race 60 containing a counter-bore 62. The annular seal 64 includes a generally annular metal ring 66 with radially extending portions 68 and 70 in which is mounted a resilient member including main body portion 71, an annular axially inner lip 72, an annular middle lip 74 axially spaced from the inner lip 72, and an annular outer lip 76 axially spaced from annular middle lip 74. The notch 78 in inner lip 72 adjacent the shaft 14, extends from the bearing space 80 containing the lubricant through inner lip 72 and into the first annular seal space 82 formed by inner lip 72 and middle lip 74. A notch 84 is formed in the middle lip 74 and extends through the middle lip 74 from the first annular seal chamber 82 to second annular seal chamber 86 formed by the middle lip 74 and the outer lip 76. A notch 88 is formed in outer lip 76 and extends from the second seal space 86 through the outer lip 76 to the outside of the seal.

Notch 78 in inner lip 72 is circumferentially spaced from notch 84 in the adjacent middle lip 74 by an approximately 180° angle; notch 88 in the outer lip 76 is circumferentially spaced from notch 84 in the adjacent middle lip 74 by an approximate 180° angle. Therefore, notch 88 in outer lip 76 is substantially in line with notch 78 in the inner lip 72. When there are two or more notches in each lip, the notches in the middle lip are spaced circumferentially midway between the notches of the first lip, and the notches in the third lip would again be substantially in line with the notches in the first lip. Other spacing could be utilized if it were found desirable for a particular structure.

Figure 5:
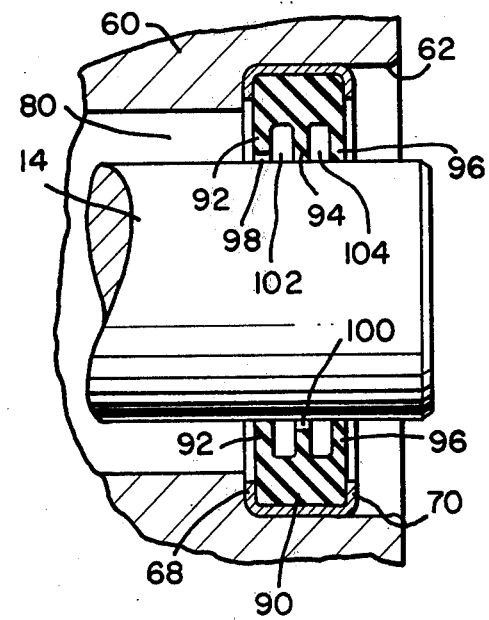
FIG. 5 is an elevational, sectional view showing still another embodiment of our invention.

In the embodiment shown in FIG. 5, a labyrinth sealing member including the annular body portion 90 may be used where contacting lips are undesirable. Inner annular lip 92, middle annular lip 94, and the outer annular lip 96 are each slightly spaced from the shaft 14. The axially extending notch 98 adjacent shaft 14 is circumferentially spaced from the axially extending notch 100 in the annular middle lip 94. The notches 98 and 100 facilitate lubricant flow to the annular areas 102 and 104 for added sealing against foreign material entering from the outside. A notch may also be located in outer lip 96 substantially in line with the notch in the inner lip. If desired, non-contacting lips may be used in conjunction with contacting lips to form still another version of our labyrinth seal.

Of course, if desired, holes similar to the holes 33 or 34 in FIG. 2 may be substituted for the notches shown in FIG. 3, FIG. 4, and FIG. 5.

While each seal is illustrated as having all lips integral with the annular body and with each other, the various seal sections could be formed separately and joined together after forming. This joining could be done by bonding together or by mechanically holding together in a seal case or otherwise.

Although not illustrated, each seal with notches or holes may incorporate on the sealing lips any of the well-known hydrodynamic sealing surfaces to assist in the exclusion of outside contaminants and the retention of the internal lubricant.

We claim:

1. A bearing comprising: a housing with an axial bore, a rotatable shaft mounted in said housing and having a diameter less than the diameter of said axial bore in the housing to provide an annular space between said housing and said shaft for containment of lubricant; and an annular seal in said annular space including an annular main body portion, an annular inner lip, and at least one other annular lip axially spaced from the inner lip, said inner lip and said at least one other annular lip each having at least one opening, the opening in the inner lip extending from the annular space containing the lubricant through the inner lip and into the annular space provided by the said two axially spaced lips; the opening in said at least one other annular lip being circumferentially spaced from the opening in the inner lip and extending from the annular space between the axially spaced lips through said at least one other annular lip, said inner lip and said at least one other lip being constructed so that any flow of lubricant through the openings will follow a torus path in the annular space provided by the two axially spaced lips.

2. A bearing in accordance with claim 1 wherein each opening is an axially extending notch adjacent the shaft.

3. A bearing in accordance with claim 1 wherein each opening is an axially extending notch adjacent the housing.

4. A bearing in accordance with claim 1 wherein each opening is a hole.

5. A bearing in accordance with claim 1 wherein said two axially spaced lips each have a plurality of openings with the openings in said at least one other annular lip being circumferentially spaced midway between the openings in the annular inner lip.

6. A bearing in accordance with claim 1 wherein the opening in the annular inner lip is circumferentially spaced from the opening in said at least one other annular lip by a 180° angle.

7. A bearing in accordance with claim 6 wherein the annular lips are in contact with the housing.

8. A bearing in accordance with claim 6 wherein the annular seal includes the annular inner lip, an annular middle lip, and a third annular lip axially spaced from the annular middle lip, said inner lip, said middle lip and said third lip being constructed so that any flow of lubricant through the openings will follow a torus path in the annular space provided by the inner lip and the middle lip and follow a torus path in the annular space provided by the middle lip and the third lip.

9. A bearing in accordance with claim 8 wherein at least one of the annular lips is slightly spaced from the shaft.

10. A bearing in accordance with claim 8 wherein at least one of the annular lips is slightly spaced from the housing.

11. A bearing in accordance with claim 8 wherein the third annular lip has an opening circumferentially aligned with the opening in the annular inner lip.

12. A bearing in accordance with claim 11 wherein the annular lips are in contact with the shaft.

13. A bearing in accordance with claim 11 wherein said three axially spaced lips each have a plurality of openings with the openings in the annular middle lip being spaced midway between the openings in the annular inner lip which are aligned with the openings in the third annular lip.

14. A seal comprising: an annular main body portion; an annular inner lip; and at least one other annular lip axially spaced from the inner lip, said inner lip and said at least one other annular lip each having at least one opening, the opening in said at least one other annular lip being circumferentially spaced from the opening in the inner lip, said inner lip and said at least one other lip being constructed so that in use any flow of lubricant through the openings will follow a torus path in the annular space provided by the two axially spaced lips.

15. A seal in accordance with claim 14 wherein each opening is a hole.

16. A seal in accordance with claim 14 wherein said two axially spaced lips each have a plurality of openings with the openings in said at least one other annular lip being circumferentially midway between the openings in the annular inner lip.

17. A seal in accordance with claim 14 wherein the opening in the annular inner lip is circumferentially spaced from the opening in said at least one other annular lip by a 180° angle.

18. A seal in accordance with claim 17 including an annular inner lip, an annular middle lip, and a third annular lip axially spaced from the annular middle lip, said inner lip, said middle lip, and said third lip being constructed so that in use any flow of lubricant through the openings will follow a torus path in the annular space provided by the inner lip and the middle lip, and follow a torus path in the annular space provided by the middle lip and the third lip.

19. A seal in accordance with claim 18 wherein the third annular lip has an opening circumferentially aligned with the opening in the annular inner lip.

20. A seal in accordance with claim 19 wherein said three axially spaced lips each have a plurality of openings with the openings in the annular middle lip being spaced midway between the openings in the annular inner lip, which are aligned with the openings in the third annular lip.

* * * * *